United States Patent
McFarland

(10) Patent No.: US 7,647,545 B2
(45) Date of Patent: Jan. 12, 2010

(54) SIGNAL AND PROTOCOL FOR REMOTE DOG TRAINER SIGNALING WITH A FORWARD ERROR CORRECTION

(75) Inventor: Scott A. McFarland, Fort Wayne, IN (US)

(73) Assignee: Radio Systems Corporation, Knoxville, TN (US)

( * ) Notice: Subject to any disclaimer, the term of this patent is extended or adjusted under 35 U.S.C. 154(b) by 881 days.

(21) Appl. No.: 11/348,215

(22) Filed: Feb. 6, 2006

(65) Prior Publication Data

US 2007/0181078 A1     Aug. 9, 2007

(51) Int. Cl.
*H03M 13/00*     (2006.01)

(52) U.S. Cl. ..................... 714/782; 714/785; 340/573.3; 119/721

(58) Field of Classification Search ................. 714/782, 714/785; 119/721; 340/573.3
See application file for complete search history.

(56) References Cited

U.S. PATENT DOCUMENTS

| | | | | |
|---|---|---|---|---|
| 3,777,712 | A | 12/1973 | Gardner et al. | 119/29 |
| 5,983,551 | A | 11/1999 | Lalor | 42/105 |
| 6,431,122 | B1 * | 8/2002 | Westrick et al. | 119/721 |
| 6,170,439 | B1 | 4/2003 | Duncan et al. | 119/720 |
| 6,549,133 | B2 | 4/2003 | Duncan et al. | 340/573.3 |
| 6,657,544 | B2 * | 12/2003 | Barry et al. | 340/573.3 |
| 6,748,902 | B1 * | 6/2004 | Boesch et al. | 119/719 |
| 6,825,768 | B2 * | 11/2004 | Stapelfeld et al. | 340/573.3 |
| 2002/0073931 | A1 | 6/2002 | Boesch et al. | 119/719 |
| 2002/0092478 | A1 | 7/2002 | Duncan et al. | |
| 2005/0145201 | A1 | 7/2005 | Gillis et al. | 119/720 |
| 2005/0172912 | A1 | 8/2005 | Crist et al. | |
| 2005/0217607 | A1 | 10/2005 | Light et al. | 119/721 |
| 2006/0176178 | A1 * | 8/2006 | Everest et al. | 340/572.1 |

OTHER PUBLICATIONS

John G. Proakis, "Digital Communications", 1995, McGraw-Hill International Editions, New York, XP002487891, pp. 386, 389 & 437.

* cited by examiner

*Primary Examiner*—Esaw T Abraham
(74) *Attorney, Agent, or Firm*—Pitts & Brittian, P.C.

(57) ABSTRACT

A transmitter for a dog training system, the transmitter having a command input device for inputting a training command input into the transmitter, and a transmitter controller connected to the command input device. The transmitter controller translates the training command input into identification data and command data. The transmitter controller also generates at least one forward error correction codeword from the identification data and the command data.

8 Claims, 7 Drawing Sheets

SIGNAL AND PROTOCOL FOR REMOTE DOG TRAINER SIGNALING WITH A FORWARD ERROR CORRECTION

BACKGROUND OF THE INVENTION

1. Field of the Invention

The present invention relates to remote dog training systems, and, more particularly, to signal processing relative to the dog training system's transmitters/receivers.

2. Description of the Related Art

Remote dog training systems typically provide at least one stimulus, via a transmitter operated by a human trainer, to a dog which is typically wearing a collar with a receiver which is responsive to the trainer's transmitter. The stimuli can include a sound/tone activation and/or an electrical stimulation, although other stimulation such as a vibrational stimulus can be used. The electrical stimulation is provided to the dog through receiver electrodes which are in contact with some part of the dog's neck. In order to accommodate differences between breeds, individual dog temperament, training conditions, etc., it is advantageous to provide a wide range of possible stimulation, which range is selectable at the transmitter by the trainer. For example, the general difference in coat/skin of one breed versus another breed may provide a general difference in contact resistance, which can generally make a given breed more correctable at a lower electrical stimulation than another breed which has a thicker coat with a downy underlayer, for example. Further, a relatively strong willed dog may require more stimulation for a given training condition than a more amenable dog. Yet further, training conditions can play a large role in determining the amount of stimulation necessary for a given dog. For example, if a dog is being trained to hunt upland gamebirds, and the hunter and/or dog inadvertently spooks a deer which is bedding nearby, the dog can easily become almost completely focused on coursing the deer. In such conditions, the hunter may need to provide a much higher level of stimulation to the dog to correct the dog from chasing the deer, and to resume the bird hunt.

Depending on terrain and/or cover conditions, the hunter may not be aware of the fact that the dog is chasing a deer, and therefore needs immediate strong correction, until the dog is a considerable distance from the hunter/trainer. As the distance between the dog and trainer increases, the need for correction may correspondingly increase, as the deer may cross a hazard such as a road with the following dog unaware or unconcerned about possible oncoming traffic. Although the above example is relative to a sporting dog, a similar situation arises in the case of off-leash obedience training of a companion dog in the presence of a darting squirrel, for example. The effective range of a transmitter/receiver pair, that is the maximum distance between a remote dog training transmitter and receiver for which a correction command transmitted by the transmitter, and is reliably received and executed by the receiver, is a function of many factors such as transmitted power output, receiver sensitivity, antenna efficiency, noise, interference, atmospheric conditions and other elements. In the case of at least some of the physical parameters of a dog training system, such as transmitted power output, receiver sensitivity and antenna efficiency, increasing the performance of these elements to increase the effective range of the system adds cost to the system components. A possible alternative to adding cost by improving component performance is increasing system performance through appropriate signal processing.

A control system and method for remote launchers (of gamebirds or training dummies) for dog training discloses a transmission signaling which includes the transmission of sixteen timing pulses, followed by a packet of information including three consecutive identification (ID) bytes constituting the address or identification of the particular launcher unit to which the transmission is intended, followed by a one-byte function code, and that is followed by a checksum byte. The checksum byte is followed by a 1400 microsecond delay before the packet of three ID bytes are re-sent. A parity bit at the end of that sequence is checked. Although the checksum byte and parity bit can possibly detect errors in the transmission, there is no accommodation for correcting any detected error. Further, although the packet of three ID bytes are re-sent, which gives a second chance to correctly identify the launcher unit to be activated, the function code is not re-sent; therefore an error in the function code causes an error in the launcher thereby reducing the system reliability.

What is needed in the art is a method and apparatus for increasing the effective range and reliability of a dog training system without increasing the cost of the system components.

SUMMARY OF THE INVENTION

The present invention provides a signal and protocol for a remote dog training system which includes forward error correction and a repeat transmission.

The invention comprises, in one form thereof, a transmitter for a dog training system, the transmitter having a command input device for inputting a training command input into the transmitter, and a transmitter controller connected to the command input device. The transmitter controller translates the training command input into identification data and command data. The transmitter controller also generates at least one forward error correction codeword from the identification data and the command data.

The invention comprises, in another form thereof, a dog training system, having a receiver, and a transmitter in electromagnetic communication with the receiver. The transmitter has a command input device which inputs a training command input into the transmitter, and a transmitter controller connected to the command input device. The transmitter controller translates the training command input into identification data and command data. The transmitter controller also generates at least one forward error correction codeword from the identification data and the command data.

The invention comprises, in yet another form thereof, a method of electromagnetic signaling between a transmitter and a receiver in a dog training system, including the steps of: receiving a training command input from a command input device of the transmitter; communicating the training command input to a transmitter controller connected to the command input device; translating the training command input by the transmitter controller into identification data and command data; and generating by the transmitter controller at least one forward error correction codeword from the identification data and the command data.

An advantage of the present invention is that it increases the effective range and reliability of a dog training system without increasing the cost of the system components Another advantage of the present invention is that it improves the performance (including at least the effective range and reliability) of a dog training system without increasing the cost of the system components.

Yet another advantage of the present invention is that it accommodates a larger number of stimulation pulses, and therefore, a wide low to high stimulation range.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
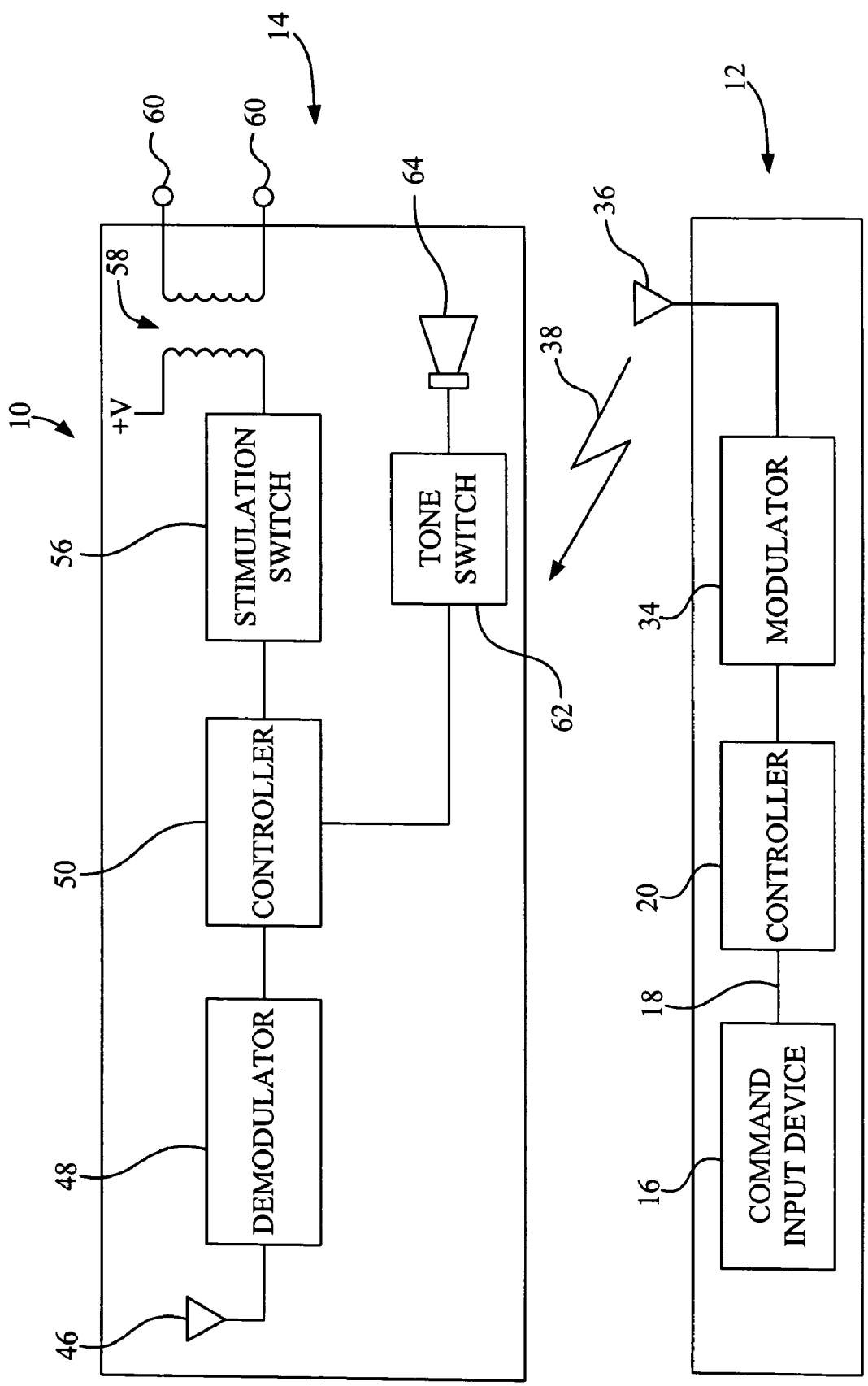
FIG. 1 is a schematic view of an embodiment of a dog training system according to the present invention.

Referring now to the drawings, and more particularly to FIG. 1, there is shown a dog training system 10, which generally includes a transmitter 12 and a receiver 14 in electromagnetic communication with transmitter 12.

Transmitter 12 generally can be a handheld device which includes a housing, and which has a command input device 16 for inputting a training command input into transmitter 12. Transmitter 12 can also include a display, such as an LCD display, which provides a visual feedback and verification of transmitter 12 functions which are selected by the trainer. Command input device 16 can be a pushbutton, multiple pushbuttons, a combination of set switches and pushbutton(s), a touchpad, a rotary selector switch, some combination thereof, or other input elements. Transmitter 12 can be used with multiple receivers 14, or multiple dogs, and a trainer selects the dog(s) to be corrected, the stimulation to be provided, and the level of stimulation by touching appropriate input elements on command input device 16. For example, command input device 16 can include 8 pushbuttons or touchpads with the following functionality: BOOST, TONE PROXIMITY, COLLAR SELECT, UP ARROW, PRIMARY STIMULATION, DOWN ARROW, CONTINUOUS/MOMENTARY, and PROGRAM, although the present invention is not limited by, or to, such functionality. Command input device 16 communicates the training command input to transmitter controller 20 using a plurality of electrical connections 18 between command input device 16 and transmitter controller 20.

Figure 2:
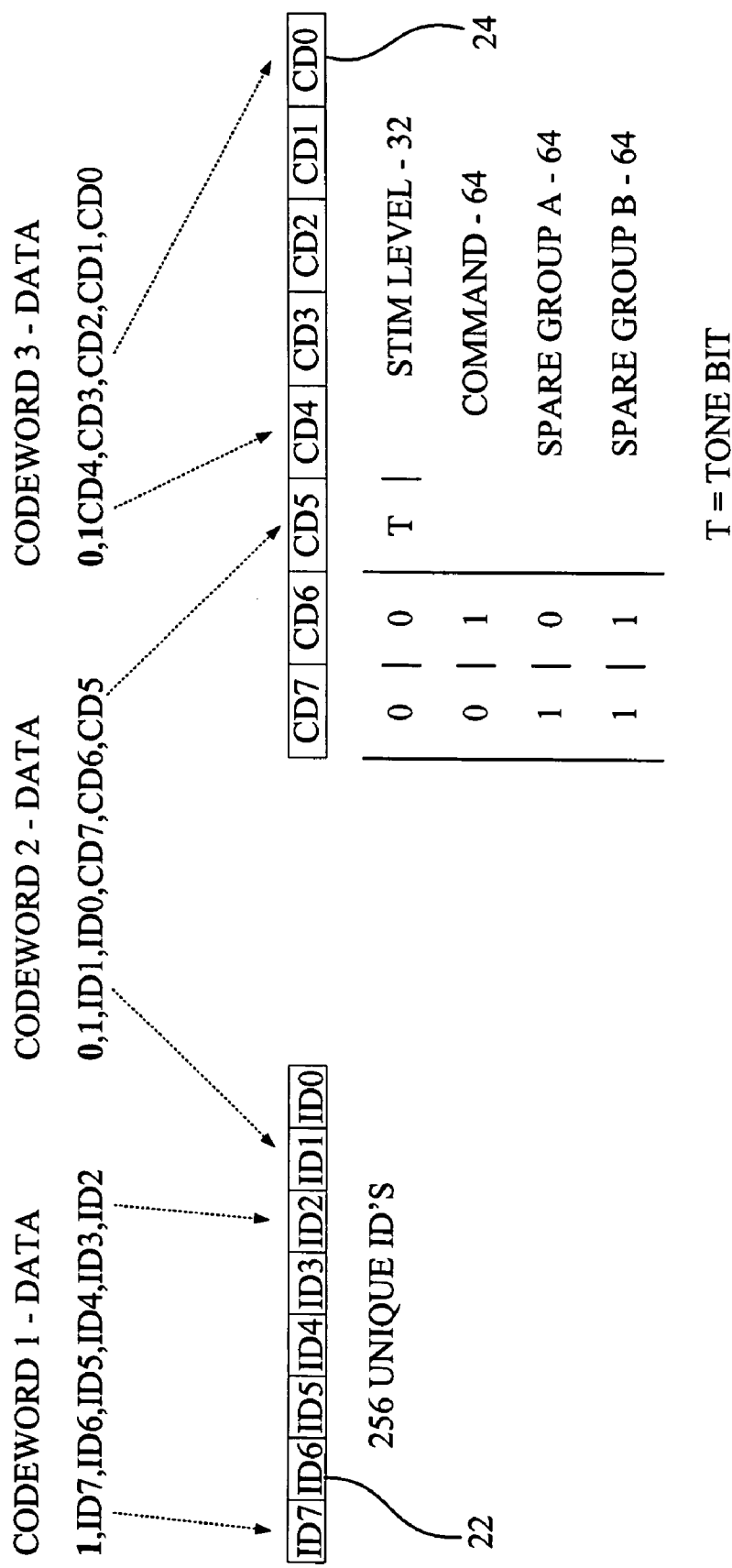
FIG. 2 is a schematic view illustrating a relationship between the forward error correction codeword data bits and the identification data and command data.
Figure 3:
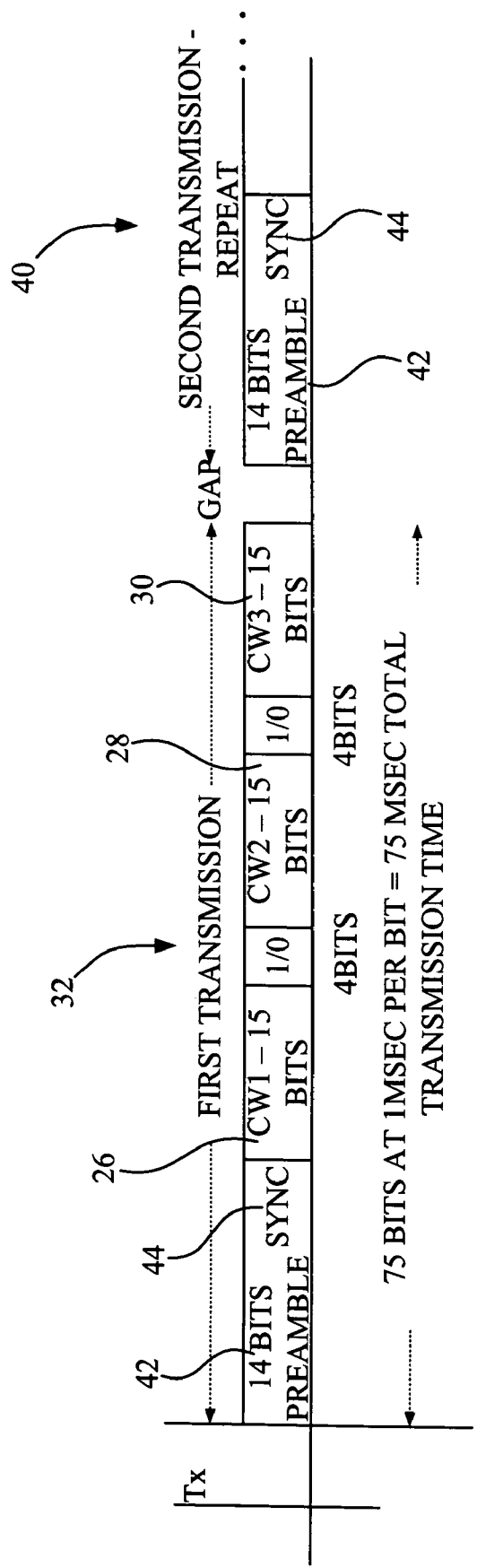
FIG. 3 is a timing diagram illustrating an embodiment of a transmission packet composition according to the present invention.

Transmitter controller 20 translates the training command input into identification data 22 and command data 24. In the embodiment shown in FIG. 2, the data requirements are 8 bits for identification data 22 (ID0-ID7) and 8 bits (CD0-CD7) for command data 24. Transmitter controller 20 generates forward error correction codewords 26, 28 and 30 from said identification data 22 and said command data 24. The forward error correction coding is BCH(15, 7) where BCH stands for Bose—Chaudhuri—Hocquenghen, which are the discoverers of a class of multiple error correcting cyclic codes. The BCH(15, 7) coding in particular takes 7 data bits as input and produces 8 bits of forward error correction (FEC) coding for a total of 15 bits in each codeword. Since the data requirement is 16 total bits (8 bits for identification data 22 (ID0-ID7) and 8 bits (CD0-CD7) for command data 24), three codewords are required. The codewords in general include 7 bits data and 8 bits FEC for a total of 15 bits (FIG. 3). The 7 data bits in codeword 1 (26) are 1, ID7, ID6, ID5, ID4, ID3, ID2, where the leading 1 signifies that it is the first codeword; the 7 data bits in codeword 2 (28) are 0, 1, ID1, ID0, CD7, CD6, CD5, where the leading 0, 1 signifies that it is not the first codeword; and the 7 data bits in codeword 3 (30) are 0, 1, CD4, CD3, CD2, CD1, CD0, where the leading 0, 1 signifies that it is not the first codeword. The 8 FEC bits can detect and correct for any 2 bit error in the 15 bit word. Generating the 8 bits FEC for each codeword depends on the 7 data bits of the respective codeword, and is shown in Tables 1-4.

TABLE 1

Generating The BCH(15, 7) Codeword:

Generating the BCH(15, 7) codeword: Generating polynomial GX = 0xE880

7 input data bits = | b6 | b5 | b4 | b3 | b2 | b1 | b0 | form an input word (16 bits) with the data bits shifted left to the MSB inword = | b6 | b5 | b4 | b3 | b2 | b1 | b0 | 0 | 0 | 0 | 0 | 0 | 0 | 0 | 0 | 0 | syndrome = calc_syn(inword);

```
unsigned int calc_syn(unsigned int inword)
{
    unsigned int temp;
    int x;
    temp = inword & 0xfffe;
    x = 0;
    while (x <= 7)
    {
        while (!(temp & 0x8000))
        {
            temp = temp << 1;
            x++;
            if (x = 7) return temp;
        }
        temp ^= GX;
    }
}
``` syndrome = | fec | fec | fec | fec | fec | fec | fec | fec | X | X | X | X | X | X | X | X | syndrome = syndrome >> 7;

outword = inword | syndrome;

| b6 | b5 | b4 | b3 | b2 | b1 | b0 | fec | fec | fec | fec | fec | fec | fec | fec | X |

---

TABLE 2

Generating Example: A Codeword 1 Example

| | | | | | | | | | | | | | | | | |
|---|---|---|---|---|---|---|---|---|---|---|---|---|---|---|---|---|
| 7 input data bits = | | 1 | 0 | 0 | 0 | 0 | 0 | 0 | | | | | | | | |
| start | x = 0 | 1 | 0 | 0 | 0 | 0 | 0 | 0 | | | | | | | | |
| | Gx | 1 | 1 | 1 | 0 | 1 | 0 | 0 | 0 | 1 | | | | | | |
| | | 0 | 1 | 1 | 0 | 1 | 0 | 0 | 0 | 1 | | | | | | |
| x = 1 | | 0 | 1 | 1 | 0 | 1 | 0 | 0 | 0 | 1 | | | | | | |
| | Gx | | 1 | 1 | 1 | 0 | 1 | 0 | 0 | 0 | 1 | | | | | |
| | | | 0 | 0 | 1 | 1 | 1 | 0 | 0 | 1 | 1 | | | | | |
| x = 2 | | 0 | 0 | 1 | 1 | 1 | 0 | 0 | 1 | 1 | | | | | | |
| x = 3 | | 0 | 1 | 1 | 1 | 0 | 0 | 1 | 1 | | | | | | | |
| | Gx | 1 | 1 | 1 | 0 | 1 | 0 | 0 | 0 | 1 | | | | | | |
| | | 0 | 0 | 0 | 1 | 1 | 1 | 0 | 1 | | | | | | | |
| x = 4 | | 0 | 0 | 0 | 1 | 1 | 1 | 0 | 1 | | | | | | | |
| x = 5 | | 0 | 0 | 1 | 1 | 1 | 0 | 1 | | | | | | | | |
| x = 6 | | 0 | 1 | 1 | 1 | 0 | 1 | | | | | | | | | |
| x = 7 | | 0 | 1 | 1 | 1 | 0 | 1 | 0 | 0 | 0 | | | | | | |
| 15 bit codeword = | | 1 | 0 | 0 | 0 | 0 | 0 | 0 | 1 | 1 | 1 | 0 | 1 | 0 | 0 | 0 |

---

TABLE 3

Generating Example: A Codeword 2/3 Example

| | | | | | | | | | | | | | | | | | |
|---|---|---|---|---|---|---|---|---|---|---|---|---|---|---|---|---|---|
| 7 input data bits = | | 0 | 1 | 0 | 0 | 0 | 0 | 0 | | | | | | | | | |
| start | x = 0 | 0 | 1 | 0 | 0 | 0 | 0 | 0 | | | | | | | | | |
| | x = 1 | 0 | 1 | 0 | 0 | 0 | 0 | 0 | | | | | | | | | |
| | Gx | | 1 | 1 | 1 | 0 | 1 | 0 | 0 | 0 | 1 | | | | | | |
| | | | 0 | 1 | 1 | 0 | 1 | 0 | 0 | 0 | 1 | | | | | | |
| x = 2 | | 0 | 1 | 1 | 0 | 1 | 0 | 0 | 0 | 1 | | | | | | | |
| | Gx | | 1 | 1 | 1 | 0 | 1 | 0 | 0 | 0 | 1 | | | | | | |
| | | | 0 | 0 | 1 | 1 | 1 | 0 | 0 | 1 | 1 | | | | | | |
| x = 3 | | 0 | 0 | 1 | 1 | 1 | 0 | 0 | 1 | 1 | | | | | | | |
| x = 4 | | 0 | 1 | 1 | 1 | 0 | 0 | 1 | 1 | | | | | | | | |
| | Gx | 1 | 1 | 1 | 0 | 1 | 0 | 0 | 0 | 1 | | | | | | | |
| | | 0 | 0 | 0 | 1 | 1 | 1 | 0 | 1 | | | | | | | | |
| x = 5 | | 0 | 0 | 0 | 1 | 1 | 1 | 0 | 1 | | | | | | | | |
| x = 6 | | 0 | 0 | 1 | 1 | 1 | 0 | 1 | | | | | | | | | |
| x = 7 | | 0 | 1 | 1 | 1 | 0 | 1 | | | | | | | | | | |
| | | 0 | 1 | 1 | 1 | 0 | 1 | 0 | 0 | | | | | | | | |
| 15 bit codeword = | | 0 | 1 | 0 | 0 | 0 | 0 | 0 | 0 | 1 | 1 | 1 | 0 | 1 | 0 | 0 |

TABLE 4

Generating Example: A Second Codeword 2/3 Example

| 7 input data bits = | | 0 | 1 | 1 | 1 | 1 | 1 | 1 | | | | | | | |
|---|---|---|---|---|---|---|---|---|---|---|---|---|---|---|---|
| start | x=0 | | 0 | 1 | 1 | 1 | 1 | 1 | 1 | | | | | | |
| | x=1 | 0 | 1 | 1 | 1 | 1 | 1 | 1 | | | | | | | |
| | Gx | | 1 | 1 | 1 | 0 | 1 | 0 | 0 | 0 | 1 | | | | |
| | | | 0 | 0 | 0 | 1 | 0 | 1 | 0 | 0 | 1 | | | | |
| | x=2 | 0 | 0 | 0 | 1 | 0 | 1 | 0 | 0 | 1 | | | | | |
| | x=3 | 0 | 0 | 1 | 0 | 1 | 0 | 0 | 1 | | | | | | |
| | x=4 | 0 | 1 | 0 | 1 | 0 | 0 | 1 | | | | | | | |
| | Gx | | 1 | 1 | 1 | 0 | 1 | 0 | 0 | 0 | 1 | | | | |
| | | | 0 | 1 | 0 | 0 | 1 | 1 | 0 | 0 | 1 | | | | |
| | x=5 | 0 | 1 | 0 | 0 | 1 | 1 | 0 | 0 | 1 | | | | | |
| | Gx | | 1 | 1 | 1 | 0 | 1 | 0 | 0 | 0 | 1 | | | | |
| | | | 0 | 1 | 1 | 1 | 0 | 0 | 0 | 1 | 1 | | | | |
| | x=6 | | 1 | 1 | 1 | 0 | 0 | 0 | 1 | 1 | | | | | |
| | Gx | | 1 | 1 | 1 | 0 | 1 | 0 | 0 | 0 | 1 | | | | |
| | | | 0 | 0 | 0 | 0 | 1 | 0 | 1 | 1 | 1 | | | | |
| | x=7 | 0 | 0 | 0 | 0 | 1 | 0 | 1 | 1 | 1 | 0 | | | | |
| 15 bit codeword = | | 0 | 1 | 1 | 1 | 1 | 1 | 1 | 0 | 0 | 0 | 1 | 0 | 1 | 1 | 1 |

Figure 4:
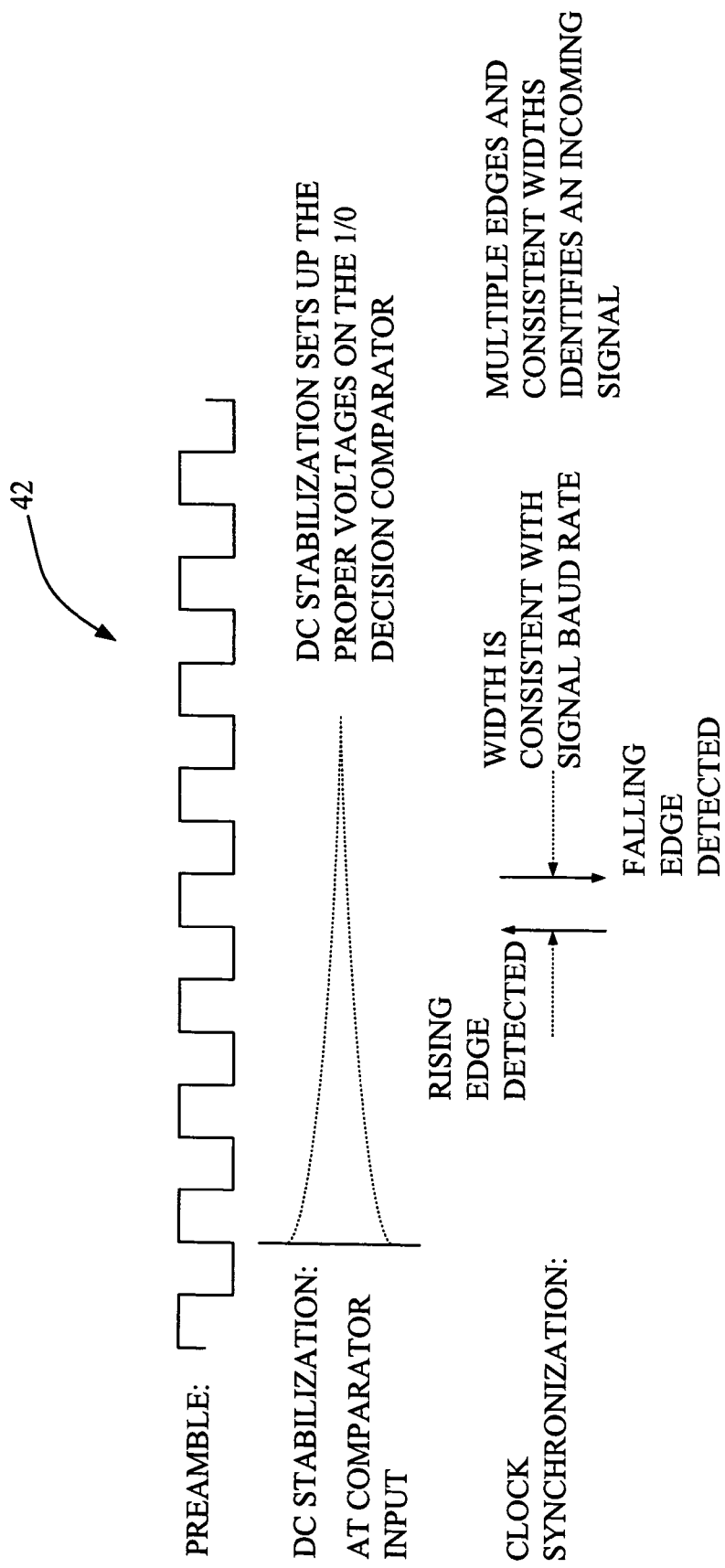
FIG. 4 is a timing diagram showing a relationship between a preamble, DC stabilization at a comparator input, and clock synchronization relative to an embodiment according to the present invention.
Figure 5:
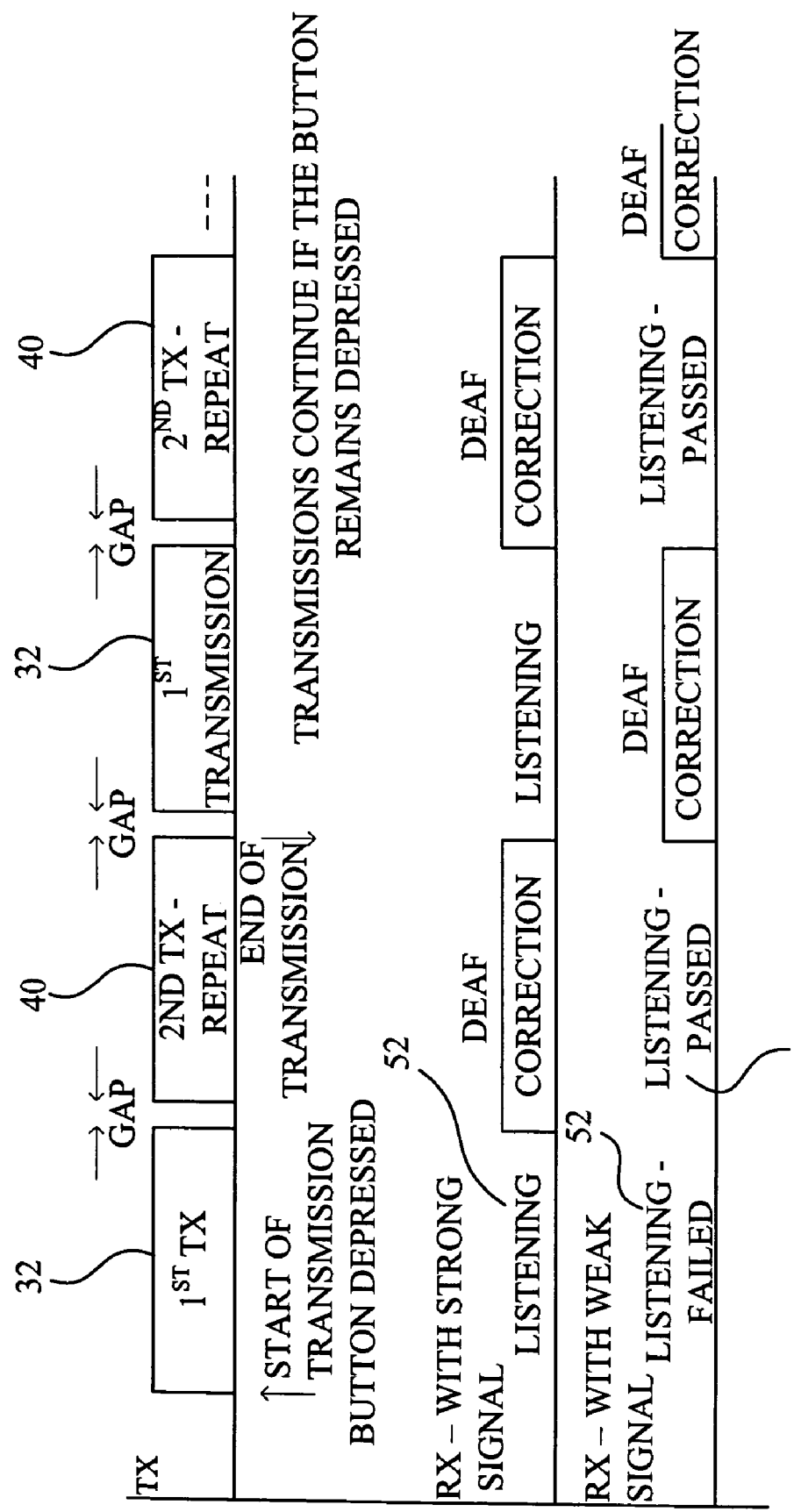
FIG. 5 is a timing diagram of an embodiment of a transmitted signal and two received signals according to the present invention.

A pattern of 1/0 transitions proceeding the codewords is needed for clock synchronization and DC stabilization. The period is be referred to hereafter as the PREAMBLE (FIGS. 3-4). An edge detect and valid width algorithm (FIG. 4) samples the data signal at a multiple of the data rate (i.e. 8 times the bit rate). These algorithms serve to differentiate a true signal from noise and properly align the bit integration window. A SYNC pattern (FIG. 3 and Table 5) is required after bit synchronization in order to establish word boundaries. The SYNC pattern chosen is OxC7 for its low cross correlation properties. The present invention provides a complete transmission within 75 ms (millisecond), and the format and baud rate are chosen to be non-return-to-zero (NRZ) @ 1000 bps. Under this scenario, 75 total bits are available (45 bits for BCH codewords leaving 30 bits available for PREAMBLE plus SYNC). However, it is also necessary to maintain a good one-zero balance within the transmit signal for the receiver hardware to decode properly. Therefore, the first 14 bits are reserved for PREAMBLE, followed by an 8 bit SYNC, followed by codeword 1 (15 bits), followed by 4 bits of one-zero leveling, followed by codeword 2 (15 bits), followed by 4 bits of one-zero leveling, ending with codeword 3 (15 bits). Determining the 4 bits of one-zero leveling bit pattern which follows codeword 1 and codeword 2 is as follows:

a) codeword 1=15 bit BCH codeword
b) Determine the number of 1's which are present in codeword 1.
c) If the number of 1's=>9, then 4 bit pattern=0000.
d) If the number of 1's=8, then 4 bit pattern=0001.
e) If the number of 1's=7, then 4 bit pattern=1110.
f) If the number of 1's<=6, hen 4 bit pattern=1111.

Transmitter controller 20 generates a first transmission packet 32 with forward error correction codewords 26, 28, 30. First transmission packet 32 includes a 14 bit digital preamble 42 (PREAMBLE), a sync byte 44 (SYNC), codeword 1 (26), 4 bits of one-zero leveling, codeword 2 (28), 4 bits of one-zero leveling and codeword 3 (30). A modulator 34 is connected to transmitter controller 20. A transmitter antenna 36 is connected to modulator 34, and transmitter 12 produces a wireless signal 38 of first transmission packet 32. Modulator 34 can be a frequency-shift keying (FSK) modulator, for example, where the digital 1s and 0s of first transmission packet 32 are represented by two frequencies, where one frequency is used to represent a binary zero, and another frequency is used to represent a binary one, and where the output frequency has no phase discontinuity. A sample first transmission packet 32 is given in Table 5.

TABLE 5

Sample Transmission

| | START → | | | | | | | | | | | | | SYNC | | | | | |
|---|---|---|---|---|---|---|---|---|---|---|---|---|---|---|---|---|---|---|---|
| Preamble: | 1 | 0 | 1 | 0 | 1 | 0 | 1 | 0 | 1 | 0 | 1 | 0 | 1 | 0 | 1 | 1 | 0 | 0 | 0 | 1 | 1 | 1 |

| | → | | | | | | | | | | | | | | | | | |
| | data MSB | | | | | data LSB | FEC MSB | | | | | | | FEC LSB | 4bit start | | | 4bit end |
| CW1 + 4bit | 1 | 0 | 0 | 0 | 0 | 0 | 1 | 1 | 1 | 0 | 1 | 0 | 0 | 0 | 1 | 1 | 1 | 1 | 1 |

| | → | | | | | | | | | | | | | | | | | |
| | data MSB | | | | | data LSB | FEC MSB | | | | | | | FEC LSB | 4bit start | | | 4bit end |
| CW2 + 4bit | 0 | 1 | 0 | 0 | 0 | 0 | 0 | 0 | 1 | 1 | 1 | 0 | 1 | 0 | 0 | 1 | 1 | 1 | 1 |

| | | | | | | | | | | | | END | | |
| | data MSB | | | | | data LSB | FEC MSB | | | | | | FEC LSB | |
| CW3 | 0 | 1 | 1 | 1 | 1 | 1 | 1 | 0 | 0 | 0 | 1 | 0 | 1 | 1 | 1 |

Wireless signal 38 includes a second transmission packet 40 following first transmission packet 32, where second transmission packet 40 is substantially identical to first transmission packet 32.

Receiver 14 is typically connected to a collar which is worn by the dog, and includes a receiver antenna 46 connected to a demodulator 48 which is connected to a receiver controller 50. Receiver 14 receives wireless signal 38 by receiver antenna 46. Demodulator 48 demodulates wireless signal 38 to produce a received first transmission packet 52. Demodulator 48 can be an FSK demodulator which reconverts the signal into a voltage and/or current binary signal. Receiver controller 50 decodes and error corrects received first transmission packet 52. Tables 6-9 illustrate how the codewords of first transmission 52 are decoded and error corrected.

TABLE 6

Decoding A Received BCH(15, 7) Codeword in_word=| b6 | b5 | b4 | b3 | b2 | b1 | b0 | fec | fec | fec | fec | fec | fec | fec | X | syndrome = calc_syn(inword);
   unsigned int calc_syn(unsigned long inword)
   {
      unsigned int temp;
      int x;
      temp = inward & 0xfffe;
      x = 0;
      while (x <= 14)
      {
         while (!(temp & 0x8000))
         {
            temp = temp << 1;
            x++;
            if(x = 15)return temp;
         }
         temp ^= GX;
      }
      temp = 0xffff;
      return temp;
   }
syndrome =| fec | fec | fec | fec | fec | fec | fec | fec | X | X | X | X | X | X | X | X | syndrome = syndrome >> 8;
errored_bits = bch1507[syndrome];

The bch1507[ ] table is provided in Table 9. It resides in FLASH memory as a CONST.

TABLE 7

Decoding A Received BCH(15, 7) Codeword (No Errors)

| | | | | | | | | | | | | | | | |
|---|---|---|---|---|---|---|---|---|---|---|---|---|---|---|---|
| in_word = | | 1 | 0 | 0 | 0 | 0 | 0 | 0 | 1 | 1 | 1 | 0 | 1 | 0 | 0 | 0 |
| start x = 0 | | 1 | 0 | 0 | 0 | 0 | 0 | 0 | 1 | 1 | 1 | 0 | 1 | 0 | 0 | 0 |
| Gx | | 1 | 1 | 1 | 0 | 1 | 0 | 0 | 0 | 1 | | | | | | |
| | | | | | | | | | | | | | | | | |
| x = 1 | | 0 | 1 | 1 | 0 | 1 | 0 | 0 | 1 | 0 | 1 | 0 | 1 | 0 | 0 | 0 |
| | 0 | 1 | 1 | 0 | 1 | 0 | 0 | 1 | 0 | 1 | 0 | 1 | 0 | 0 | 0 | |
| Gx | | 1 | 1 | 1 | 0 | 1 | 0 | 0 | 0 | 1 | | | | | | |
| | | | | | | | | | | | | | | | | |
| | | 0 | 0 | 1 | 1 | 1 | 0 | 1 | 0 | 0 | 0 | 1 | 0 | 0 | 0 | 0 |
| x = 2 | 0 | 0 | 1 | 1 | 1 | 0 | 1 | 0 | 0 | 0 | 1 | 0 | 0 | 0 | | |
| x = 3 | 0 | 1 | 1 | 1 | 0 | 1 | 0 | 0 | 0 | 1 | 0 | 0 | 0 | | | |
| Gx | | 1 | 1 | 1 | 0 | 1 | 0 | 0 | 0 | 1 | | | | | | |
| | | | | | | | | | | | | | | | | |
| x = 3 | | 0 | 0 | 0 | 0 | 0 | 0 | 0 | 0 | 0 | 0 | 0 | 0 | 0 | 0 | 0 |
| x = 15 | | 0 | 0 | 0 | 0 | 0 | 0 | 0 | 0 | 0 | 0 | 0 | 0 | 0 | 0 | 0 |
| syndrome = | | 0 | 0 | 0 | 0 | 0 | 0 | 0 | 0 | | | | | | | |
| syndrome = | 0x00 | | | | | | | | | | | | | | | |
| bch1507[0x00] = | 0x00 no errors detected | | | | | | | | | | | | | | | |

TABLE 8

Decoding A Received BCH(15, 7) Codeword (With 2 Errors)

| | | | | | | | | | | | | | | | |
|---|---|---|---|---|---|---|---|---|---|---|---|---|---|---|---|
| in_word = | | 1 | 0 | 0 | 0 | 0 | 0 | 0 | 1 | 1 | 1 | 0 | 1 | 0 | 0 | 0 |
| errors = | | 0 | 0 | 0 | 1 | 0 | 0 | 0 | 0 | 0 | 0 | 1 | 0 | 0 | 0 | 0 |
| result = | | 1 | 0 | 0 | 1 | 0 | 0 | 0 | 1 | 1 | 1 | 1 | 1 | 0 | 0 | 0 |
| start x = 0 | | 1 | 0 | 0 | 1 | 0 | 0 | 0 | 1 | 1 | 1 | 1 | 1 | 0 | 0 | 0 |
| Gx | | 1 | 1 | 1 | 0 | 1 | 0 | 0 | 0 | 1 | | | | | | |
| | | | | | | | | | | | | | | | | |
| | | 0 | 1 | 1 | 1 | 1 | 0 | 0 | 1 | 0 | 1 | 0 | 0 | 0 | 0 | 0 |
| x = 1 | 0 | 1 | 1 | 1 | 1 | 0 | 0 | 1 | 0 | 1 | 0 | 0 | 0 | 0 | | |
| Gx | | 1 | 1 | 1 | 0 | 1 | 0 | 0 | 0 | 1 | | | | | | |
| | | | | | | | | | | | | | | | | |
| | | 0 | 0 | 0 | 1 | 1 | 0 | 1 | 0 | 0 | 0 | 0 | 0 | 0 | 0 | 0 |

TABLE 8-continued

Decoding A Received BCH(15, 7) Codeword (With 2 Errors)

| | | | | | | | | | | | | | | | |
|---|---|---|---|---|---|---|---|---|---|---|---|---|---|---|---|
| x = 2, 3, 4 | 1 | 1 | 0 | 1 | 0 | 0 | 0 | 0 | 0 | 0 | 0 | 0 | 0 | 0 | 0 |
| Gx | 1 | 1 | 1 | 0 | 1 | 0 | 0 | 0 | 1 | | | | | | |
| | 0 | 0 | 1 | 1 | 1 | 0 | 0 | 0 | 1 | 0 | 0 | 0 | 0 | 0 | 0 |
| x = 5, 6 | 1 | 1 | 1 | 0 | 0 | 0 | 1 | 0 | 0 | 0 | 0 | 0 | 0 | 0 | 0 |
| Gx | 1 | 1 | 1 | 0 | 1 | 0 | 0 | 0 | 1 | | | | | | |
| | 0 | 0 | 0 | 0 | 1 | 0 | 1 | 0 | 1 | 0 | 0 | 0 | 0 | 0 | 0 |
| x = 7, 8, 9, 10 | 1 | 0 | 1 | 0 | 1 | 0 | 0 | 0 | 0 | 0 | 0 | 0 | 0 | 0 | 0 |
| Gx | 1 | 1 | 1 | 0 | 1 | 0 | 0 | 0 | 1 | | | | | | |
| | 0 | 1 | 0 | 0 | 0 | 0 | 0 | 0 | 1 | 0 | 0 | 0 | 0 | 0 | 0 |
| x = 11 | 1 | 0 | 0 | 0 | 0 | 0 | 0 | 1 | 0 | 0 | 0 | 0 | 0 | 0 | 0 |
| Gx | 1 | 1 | 1 | 0 | 1 | 0 | 0 | 0 | 1 | | | | | | |
| | 0 | 1 | 1 | 0 | 1 | 0 | 0 | 1 | 1 | 0 | 0 | 0 | 0 | 0 | 0 |
| x = 12 | 1 | 1 | 0 | 1 | 0 | 0 | 1 | 1 | 0 | 0 | 0 | 0 | 0 | 0 | 0 |
| Gx | 1 | 1 | 1 | 0 | 1 | 0 | 0 | 0 | 1 | | | | | | |
| | 0 | 0 | 1 | 1 | 1 | 0 | 1 | 1 | 1 | 0 | 0 | 0 | 0 | 0 | 0 |
| x = 13, 14 | 1 | 1 | 1 | 0 | 1 | 1 | 1 | 0 | 0 | 0 | 0 | 0 | 0 | 0 | 0 |
| Gx | 1 | 1 | 1 | 0 | 1 | 0 | 0 | 0 | 1 | | | | | | |
| | 0 | 0 | 0 | 0 | 0 | 1 | 1 | 0 | 1 | 0 | 0 | 0 | 0 | 0 | 0 |
| x = 15 | 0 | 0 | 0 | 0 | 1 | 1 | 0 | 1 | 0 | 0 | 0 | 0 | 0 | 0 | 0 |
| syndrome = | 0 | 0 | 0 | 0 | 1 | 1 | 0 | 1 | syndrome = 0x0D | | | | | | |
| bch1507[0x0D] = | 0x1010 | | | | | | | | | | | | | | |
| errors = | 0 | 0 | 0 | 1 | 0 | 0 | 0 | 0 | 0 | 0 | 1 | 0 | 0 | 0 | |
| corrected codeword = received error'd codeword Exclusive Or errors | | | | | | | | | | | | | | | | |

TABLE 9

BCH1507[ ] Bits In Error Table
If the return from this table is NOT 0xFFFF, then Exclusive Or the received word with the table value to correct the bit errors. A return value of 0xFFFF indicates an uncorrectable error condition.

```
unsigned int bch1507[256] = {
0x0000, 0x0100, 0x0200, 0x0300, 0x0400, 0x0500, 0x0600, 0x0044, 0x0800, 0x0900, 0x0a00, 0xffff, 0x0c00,
0x1010, 0x0088, 0xffff, 0x1000, 0x1100, 0x1200, 0xffff, 0x1400, 0x0810, 0xffff, 0xffff, 0x1800, 0x0410,
0x2020, 0xffff, 0x0110, 0x0010, 0xffff, 0x0210, 0x2000, 0x2100, 0x2200, 0xffff, 0x2400, 0xffff, 0xffff,
0x0030, 0x2800, 0xffff, 0x1020, 0xffff, 0xffff, 0xffff, 0xffff, 0xffff, 0x3000, 0xffff, 0x0820, 0x4004,
0x4040, 0xffff, 0xffff, 0x000a, 0x0220, 0x0082, 0x0020, 0x0120, 0xffff, 0x2010, 0x0420, 0xffff, 0x4000,
0x4100, 0x4200, 0xffff, 0x4400, 0xffff, 0xffff, 0xffff, 0x4800, 0x0024, 0xffff, 0xffff, 0xffff, 0xffff,
0x0060, 0xffff, 0x5000, 0x8002, 0xffff, 0x2004, 0x2040, 0xffff, 0xffff, 0xffff, 0xffff, 0xffff, 0xffff,
0xffff, 0xffff, 0x4010, 0xffff, 0xffff, 0x6000, 0xffff, 0xffff, 0x1004, 0x1040, 0xffff, 0x8008, 0xffff,
0x8080, 0x0050, 0xffff, 0xffff, 0xffff, 0xffff, 0x0014, 0xffff, 0x0440, 0x0204, 0x0104, 0x0004, 0x0040,
0x0140, 0x0240, 0x0404, 0xffff, 0xffff, 0x4020, 0x0804, 0x0840, 0xffff, 0xffff, 0xffff, 0x8000, 0x8100,
0x8200, 0xffff, 0x8400, 0xffff, 0xffff, 0xffff, 0xffff, 0x8800, 0xffff, 0xffff, 0xffff, 0xffff, 0xffff,
0xffff, 0x9000, 0x4002, 0x0048, 0xffff, 0xffff, 0x000c, 0xffff, 0xffff, 0xffff, 0xffff, 0xffff, 0x0084,
0x00c0, 0x8010, 0xffff, 0xffff, 0xa000, 0xffff, 0x0006, 0xffff, 0xffff, 0x0042, 0x4008, 0xffff, 0x4080,
0xffff, 0xffff, 0xffff, 0xffff, 0xffff, 0xffff, 0xffff, 0xffff, 0xffff, 0xffff, 0xffff, 0xffff,
0xffff, 0xffff, 0xffff, 0xffff, 0x8020, 0xffff, 0xffff, 0xffff, 0xffff, 0xc000, 0x1002, 0xffff,
0xffff, 0xffff, 0xffff, 0x2008, 0xffff, 0x2080, 0xffff, 0xffff, 0xffff, 0x0012, 0xffff, 0xffff, 0xffff,
0x0102, 0x0002, 0x00a0, 0x0202, 0xffff, 0x0402, 0xffff, 0xffff, 0xffff, 0x0802, 0xffff, 0xffff, 0x0028,
0xffff, 0xffff, 0xffff, 0x0880, 0xffff, 0x0408, 0xffff, 0x0208, 0xffff, 0x0008, 0x0108, 0x0080, 0x0180,
0x0280, 0x0022, 0x0480, 0x0580, 0x0808, 0xffff, 0xffff, 0x2002, 0xffff, 0x8004, 0x8040, 0x0090, 0x1008,
0xffff, 0x1080, 0xffff, 0xffff, 0x0018, 0xffff, 0xffff, 0xffff, 0xffff,
};
```

Wireless signal 38 includes second transmission packet 40 following first transmission packet 32. If received first transmission packet 52 includes non-correctable errors (8 FEC bits can detect and correct for any 2 bit error in the 15 bit word so that a non-correctable error is one having three or more error bits), demodulator 48 demodulates wireless signal 38 to produce a received second transmission 54 packet. Receiver controller 50 decodes and error corrects the codewords of received second transmission 54 as illustrated in Tables 6-9. The present invention provides a signal-plus-noise-plus-distortion to noise-plus-distortion ratio (SINAD) gain due to the forward error correction as follows.

g) desired packet (or signal) success rate=(bit success rate)$^{length\ of\ packet}$ h) packet success rate=0.99 i) bit success rate=(1−bit error rate)

For the signal and protocol described previously, the packet length is 45 bits (three 15 bit codewords).

j) $0.99 = (1-BER)^{45}$ k) $0.9997767 = (1-BER)$ l) BER (bit error rate)=$2.233 \times 10^{-4}$ Thus, for an unprotected packet length of 45 bits, a BER of 0.000233 is required for a success rate of 0.99. As mentioned previously, BCH(15,7) will tolerate 2 errors in the 15 bit codeword. This equates to a BER tolerance of 0.1333. Standard curves for SINAD versus error probability for FSK data transmissions are available in "Digital and Analog Communication Systems", K. SamShanmugam as well as other sources. The SINAD required for a $10^{-4}$ BER is roughly 15 dB and the SINAD required for a $10^{-1}$ BER is roughly 9 dB, thus providing a coding gain of roughly 6 db for a 45 bit transmission. At a given success rate, error correction coding can operate at a lower SINAD which translates into increased range at the same success rate.

To compare the present invention to a transmission signal composed of 16 unprotected data bits, the BER required for a 0.99 transmission success rate is as follows.

m) $0.99=(1-BER)^{16}$
n) $0.9997767=(1-BER)$
o) $BER=6.28\times10^{-4}$

Again, this roughly equates to a SINAD of 15 dB for FSK. With the forward error correction coding gain of 6 dB of the present invention, a range improvement can be expected which is given by:

p) $6=20\log(d)$; considering only free space loss OR
q) $6=33.2\log(d)$; considering a more practical loss profile of 10 dB per doubling of the distance. Therefore,
r) $d=1.5$; or a 50% increase in range for the same performance level.

Further, the present invention has the additional advantage of, if received first transmission packet 52 has more than 2 bits of errors (uncorrectable error), receiver 14 listens to wireless signal 38 to produce a received second transmission packet 54, which gives receiver 14 a second chance to execute the trainer's command.

Receiver controller 50 uses the decoded and error corrected transmission packet to activate tone switch 62 and/or stimulation switch 56, which are both connected to receiver controller 50, according to the trainer's command inputted at command input device 16 by the trainer. If tone switch 62 is activated, switch 62 correspondingly activates annunciator 64 to provide correction to the dog with a tone or other sound. If stimulation switch 56 is activated, switch 56 correspondingly activates transformer 58, which using the transformer flyback principal of operation for example, provides correction to the dog with electrical stimulation through electrodes 60. Although the present invention obviously includes the remote functions of tone activation and stimulation activation, provisions are included to allow for expanding the set of remote functions (i.e., beeper functions (a beeper is worn on the dog collar and produces a sound that is detectable by the trainer to locate the dog in heavy cover, among other functions), and auxiliary devices such as launchers).

The transmission protocol of the present invention can be used with "high end" training products, with a relatively large degree of functionality, and with which it is desirable to have a wide (low to high) stimulation range. Each of the transmission packets is 75 ms long (75 bits/1000 bps) and there are 8 ms gaps between the transmissions. The correction period outputted by receiver controller 50 starts at the end of a successfully decoded transmission, when receiver 14 has disabled signal reception, and starts with a 6 ms period (decode+ hardware reconfigure time+stimulation capacitor charge time), followed by up to 15 fundamental correction widths of 5.3 ms, and ending with 5 ms hardware reconfigure+settling time. Therefore, the correction pulse period=(15×5.3 ms)+ 0.3 ms=79.8 ms (allows for a maximum of 16 stimulation pulses), and the deaf period=correction period+startup+settling=79.8 ms+6 ms+5 ms=90.8 ms. Each fundamental correction or stimulation period of 5.3 ms includes time period TW1=300 μs (microsecond), followed by time period TW2=500 μs, followed by time period TW3=4000 μs, followed by time period TW4=500 μs. TW1 time is used to generated the stimulation pulse width which can range from a minmum of 1.2 μs to a maximum of 300 μs. At the conclusion of TW1 the stimulation output capacitor begins to recharge. There is 5000 μs available for this capacitor to recharge. TW2 is used as buffer between stimulation and start of tone. Ta occurs at 800 μs from the start of each fundamental correction width. It is the time at which the tone may begin. TW3 is filled with as many cycles of the desired tone as possible. Tb occurs at 4800 μs from the start of each fundamental correction width. It is the time at which the tone must end. TW4 is used as buffer between tone and the start of the next correction width. After TW1 in correction width 16, the stimulation enable signal is made FALSE and the reconfiguration and settling of the receiver hardware may begin.

Figure 6:
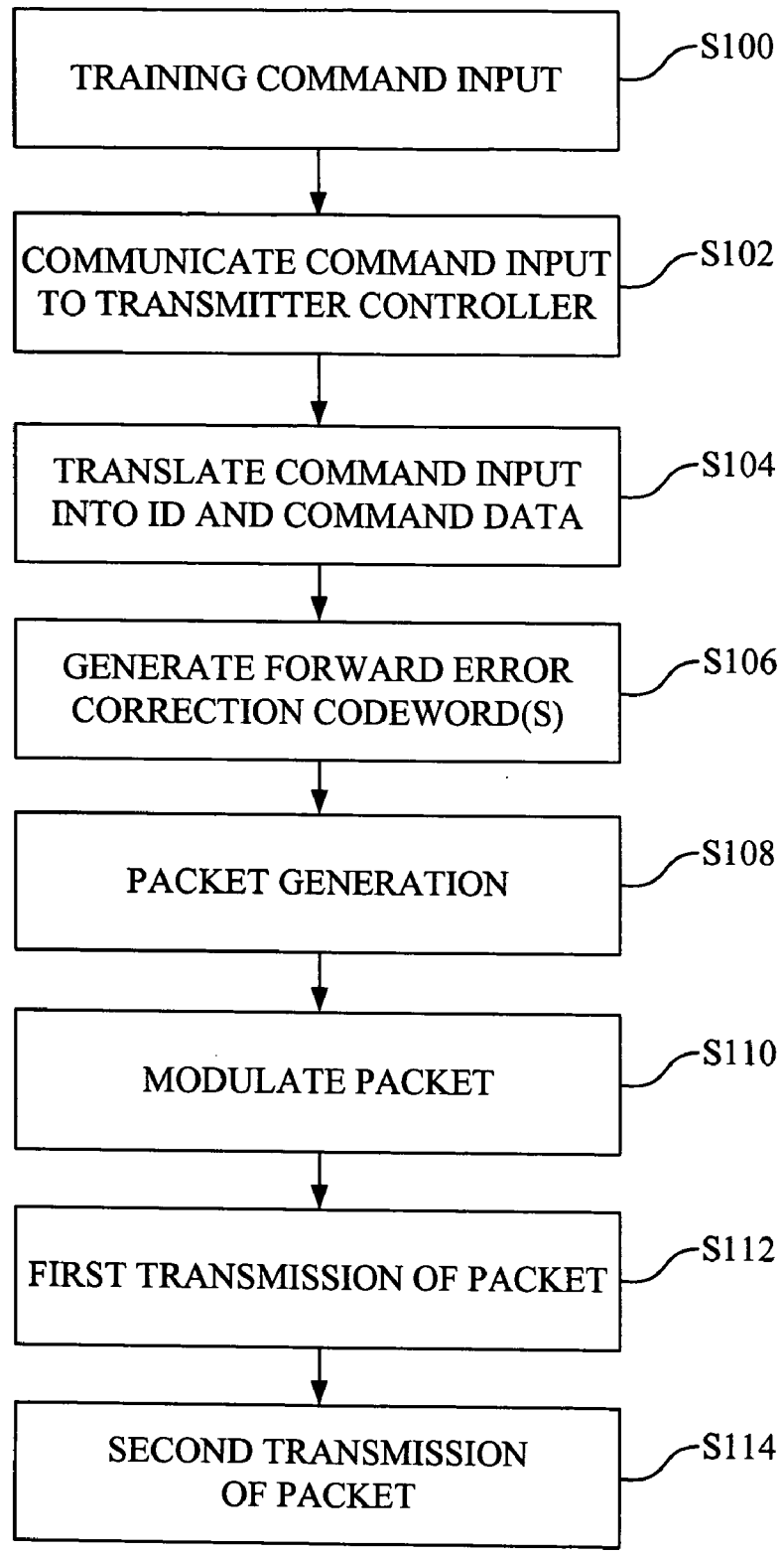
FIG. 6 is a flowchart of an embodiment of a method of electromagnetic signaling between a transmitter and a receiver in a dog training system according to the present invention.
Figure 7:
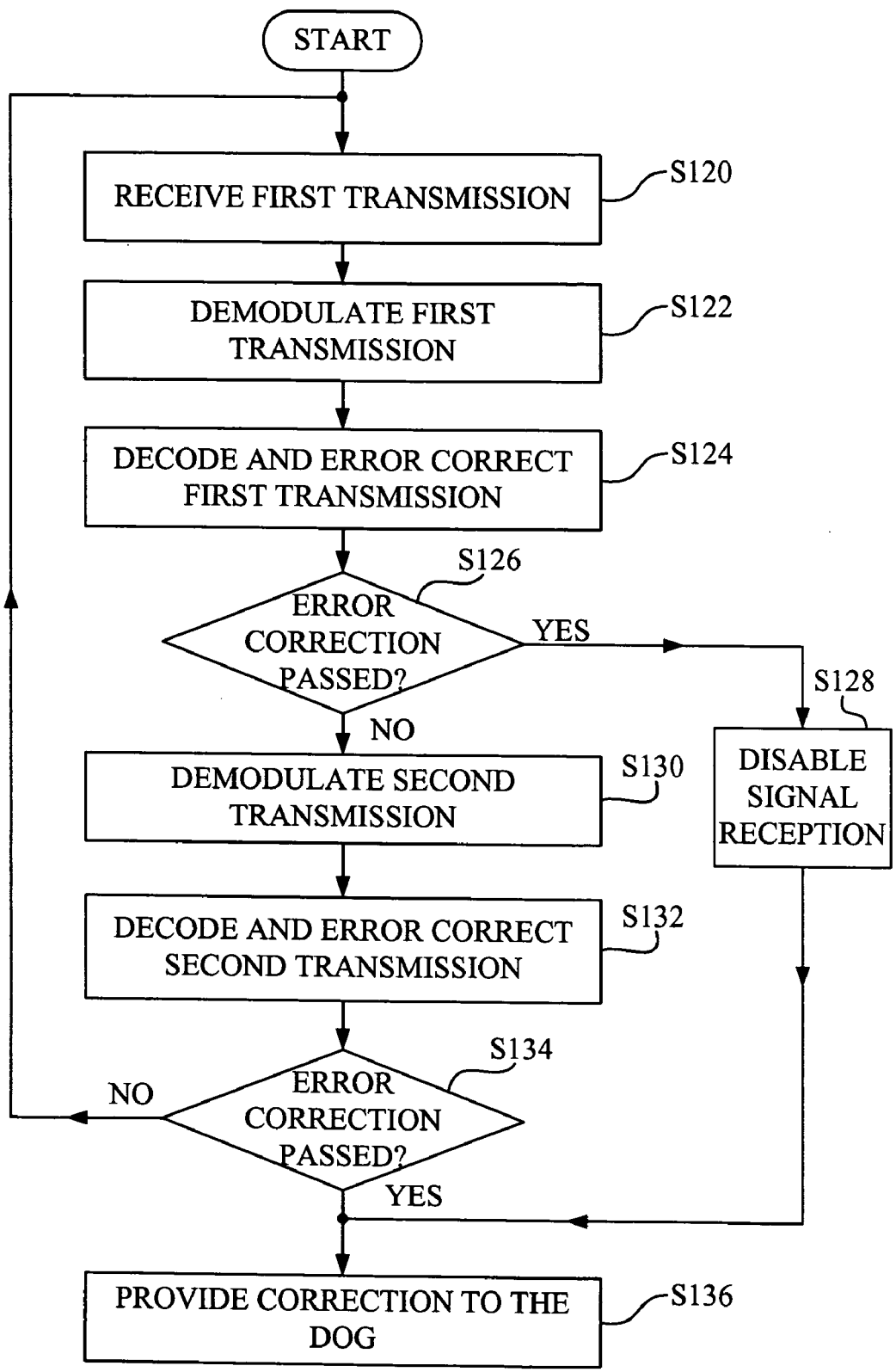
FIG. 7 is a flowchart of a continuation of the embodiment of the method of electromagnetic signaling between a transmitter and a receiver of FIG. 6.

In use the present invention discloses a method (FIGS. 6-7) of electromagnetic signaling between a transmitter and a receiver in a dog training system, comprising the steps of: receiving (S100) a training command input from command input device 16 of transmitter 12; communicating (S102) the training command input to transmitter controller 20 connected to command input device 16; translating (S104) the training command input by transmitter controller 20 into identification data 22 and command data 24; and generating (S106) by transmitter controller 20 at least one forward error correction codeword 26, 28, 30 from identification data 22 and command data 24. The method can further include the step of generating (S108) with transmitter controller 20 a first transmission packet 32 with the at least one forward error correction codeword 26, 28,30. In steps S110 and S112, a wireless signal 38 is produced of first transmission packet 32 with modulator 34 connected to transmitter controller 20 and a transmitter antenna 36 connected to modulator 34. Wireless signal 38 can include second transmission packet 40 following (S114) first transmission packet 32, where second transmission packet 40 is substantially identical to first transmission packet 32. The method can further include the steps of receiving (S120) wireless signal 38 by a receiver 14 including a receiver antenna 46 connected to demodulator 48 which is connected to a receiver controller 50; demodulating (S122) wireless signal 38 with demodulator 48, where demodulator 48 produces received first transmission packet 52; and decoding and error correcting (S124) received first transmission packet 52 with receiver controller 50. Step S126 determines if the error correction, or listening, of received first transmission packet 52 passed. If the error correction, or listening, of received first transmission packet 52 passed, then receiver 14 disables (S128) signal reception, particularly of second transmission packet 40, and correction is provided (S136) to the dog. If received first transmission packet 52 includes non-correctable errors (S126), then step S130 provides a second transmission packet 40 is provided following first transmission packet 32 in electromagnetic signal 38, and demodulates wireless signal 38 with demodulator 48 to produce a received second transmission packet 54. The step of S132 decodes and error corrects received second transmission packet 54 with receiver controller 50. If the error correction, or listening, of received second transmission packet 54 passes (S134), correction is provided (S136) to the dog. If the error correction, or listening, of received second transmission packet 54 does not pass (S134), then the trainer must resend the command, or send another command.

The method of the present invention can be implemented in hardware, software, firmware, or some combination thereof.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A dog training system, comprising:
a receiver; and
a transmitter in electromagnetic communication with said receiver, said transmitter including a command input device for inputting a training command input into said transmitter, and a first controller connected to said command input device, said first controller for translating said training command input into identification data and command data, said first controller generating at least one forward error correction codeword from said identification data and said command data, wherein said first controller generates a first transmission packet with said at least one forward error correction codeword, a modulator connected to said first controller and a transmitter antenna connected to said modulator, said transmitter producing a wireless signal of said first transmission packet, wherein said receiver includes a receiver antenna connected to a demodulator which is connected to a second controller, said receiver receiving said wireless signal by said receiver antenna, said demodulator demodulating said wireless signal to produce a received first transmission, said second controller decoding and error correcting said received first transmission, wherein said received first transmission packet includes non-correctable errors, said wireless signal includes a second transmission packet following said first transmission packet, said demodulator demodulating said wireless signal to produce a received second transmission, said second controller decoding and error correcting said received second transmission.

2. The dog training system of claim 1, wherein said wireless signal includes a second transmission packet following said first transmission packet, said second transmission packet is substantially identical to said first transmission packet.

3. The dog training system of claim 1, wherein said first transmission packet includes a digital preamble and a sync byte.

4. The dog training system of claim 1, wherein said at least one forward error correction codeword is a BCH(15, 7) codeword.

5. A method of electromagnetic signaling between a transmitter and a receiver in a dog training system, comprising the steps of:
receiving a training command input from a command input device of said transmitter;
communicating said training command input to a first controller connected to said command input device;
translating said training command input by said first controller into identification data and command data;
generating by said first controller at least one forward error correction codeword from said identification data and said command data;
generating with said first controller a first transmission packet with said at least one forward error correction codeword;
producing a wireless signal of said first transmission packet with a modulator connected to said first controller and a transmitter antenna connected to said modulator;
receiving said wireless signal by a receiver including a receiver antenna connected to a demodulator which is connected to a second controller;
demodulating said wireless signal with said demodulator, said demodulator producing a received first transmission packet;
decoding and error correcting said received first transmission packet with said second controller;
determining if said received first transmission packet includes non-correctable errors;
providing a second transmission packet following said first transmission packet in said electromagnetic signal;
demodulating said wireless signal with said demodulator to produce a received second transmission packet; and
decoding and error correcting said received second transmission packet with said second controller.

6. The method of claim 5, wherein said wireless signal includes a second transmission packet following said first transmission packet, said second transmission packet is substantially identical to said first transmission packet.

7. The method of claim 5, wherein said first transmission packet includes a digital preamble and a sync byte.

8. The method of claim 5, wherein generating step generates said at least one forward error correction codeword as a BCH(15, 7) codeword.

* * * * *